United States Patent
Smotkin et al.

[11] Patent Number: 5,846,669
[45] Date of Patent: Dec. 8, 1998

[54] HYBRID ELECTROLYTE SYSTEM

[75] Inventors: Eugene S. Smotkin, Chicago, Ill.; Thomas E. Mallouk, State College, Pa.; Michael D. Ward, Minnetonka, Minn.; Kevin L. Ley, Reading, United Kingdom

[73] Assignee: Illinois Institute of Technology, Chicago, Ill.

[21] Appl. No.: 586,595

[22] Filed: Jan. 16, 1996

Related U.S. Application Data

[63] Continuation-in-part of Ser. No. 241,647, May 12, 1994, abandoned.

[51] Int. Cl.$^6$ .................................................. H01M 8/00
[52] U.S. Cl. ............................... 429/41; 429/40; 429/46
[58] Field of Search ............................ 429/41, 33, 13, 429/40, 30, 46, 34

[56] References Cited

U.S. PATENT DOCUMENTS

| | | | |
|---|---|---|---|
| 3,522,095 | 7/1970 | Baker, Jr. et al. | 429/30 |
| 3,615,948 | 10/1971 | Krostewitz | 156/3 |
| 3,977,901 | 8/1976 | Buzzelli | 436/86 A |
| 4,390,603 | 6/1983 | Kawana et al. | 429/30 |
| 4,443,522 | 4/1984 | Struthers | 429/18 |
| 4,562,123 | 12/1985 | Shimizu et al. | 429/27 |
| 4,664,761 | 5/1987 | Zupancic et al. | 204/129 |
| 4,783,381 | 11/1988 | Tytgat et al. | 429/15 |
| 4,810,485 | 3/1989 | Marianowski et al. | 423/648.1 |
| 4,828,941 | 5/1989 | Sterzel | 429/33 |
| 4,894,301 | 1/1990 | Dyer | 429/193 |
| 4,948,680 | 8/1990 | Madou et al. | 429/13 |
| 4,981,763 | 1/1991 | Mitsuda et al. | 429/41 |
| 4,988,582 | 1/1991 | Dyer | 429/30 |
| 4,988,583 | 1/1991 | Watkins et al. | 429/30 |
| 5,102,750 | 4/1992 | Taylor | 429/30 |
| 5,132,193 | 7/1992 | Reddy et al. | 429/13 |
| 5,139,541 | 8/1992 | Edlund | 55/16 |
| 5,141,604 | 8/1992 | Ayers | 204/59 R |
| 5,162,166 | 11/1992 | Ellgen | 429/30 |
| 5,183,549 | 2/1993 | Joseph et al. | 204/415 |
| 5,252,410 | 10/1993 | Wilkinson et al. | 429/33 |
| 5,272,017 | 12/1993 | Swathirajan et al. | 429/33 |
| 5,318,863 | 6/1994 | Dhar | 429/30 |
| 5,350,643 | 9/1994 | Imahashi et al. | 429/33 |
| 5,372,896 | 12/1994 | Binder et al. | 429/33 |

OTHER PUBLICATIONS

*Fuel Cell Systems*, (Eds. Blomen, L.J.M.J., and Mugerwa, M.N.), Plenum Press, New York, 1993, Chapter 2: pp. 42–52, 63–69, Chapter 3: pp. 88–97, p. 110, Chapters 7, 8, 11.

Appleby, A.J., and F.R. Foulkes, *Fuel Cell Handbook*, Krieger Publishing Co., Malabar, FL, 1993, Chapters 8, 10, 11, 12, 13, 16.

Hirchenhofer, J.H., Stauffer, D.B., and Engleman, R.R., *Fuel Cells — A Handbook* (Revision 3) DOE/METC—94/1006, Jan. 1994, pp. 6–10 to 6–17.

*Quantitative Chemical Analysis*, "Chromatographic Methods and Capillary Electrophoresis", (Daniel C. Harris), 4th Edition, 1982.

Appleby, A.J., and Foulkes, F.R., *Fuel Cell Handbook*, "Electrolytes", Krieger Publishing Co., Malabar, FL, Chapter 10, pp. 263–265.

Appleby, A.J., and Foulkes, F.R., *Fuel Cell Handbook*, "Cathodic Electrocatalysis", Krieger Publishing Co., Malabar, FL, pp. 405–406.

*Primary Examiner*—John A. McPherson
*Attorney, Agent, or Firm*—Speckman Pauley Petersen & Fejer

[57] ABSTRACT

A hybrid electrolyte system for fuel cells and other electrochemical reactors comprising an acid electrolyte, a base electrolyte, and a proton permeable dense phase separating the acid electrolyte from the base electrolyte.

7 Claims, 3 Drawing Sheets

HYBRID ELECTROLYTE SYSTEM

Cross-Reference to Related Application

This is a continuation-in-part patent application of co-pending patent application having Ser. No. 08/241,647, filed 12 May 1994, now abandoned.

BACKGROUND OF THE INVENTION

1. Field of the Invention

This invention relates to a hybrid acid/base electrolyte system for fuel cells and other electrochemical reactors operating in a temperature range up to about 300° C. The primary application for this invention is in fuel cells which are electrochemical devices that convert chemical energy associated with fuels, such as hydrogen or alcohols, into electricity. Other applications for this invention include use in electrochemical reactors for the synthesis of industrially important chemicals such as aldehydes and carboxylic acids.

2. Description of Prior Art

Electrochemical devices, such as fuel cells, comprise an electrolyte, an air (or oxygen) electrode, and a fuel electrode. Alkaline fuel cells and phosphoric acid fuel cells constitute relatively mature forms of existing fuel cell technology. The main advantages of alkaline fuel cells arise from the excellent electrochemical properties of alkaline electrolytes. The electrode reaction kinetics for oxygen reduction are much better in an alkaline electrolyte (for example potassium hydroxide) as compared to an acid electrolyte (for example phosphoric acid). See, for example, Hirchenhofer, J. H., Stauffer, D. B., and Engleman, R. R., *Fuel Cells —A Handbook* (Revision 3) DOE/METC-94/1006, January 1994. The use of an alkaline electrolyte also can eliminate the need for expensive noble metal catalysts. Non-noble metal catalysts, such as carbon-supported transition-metal macrocyclics and their derivatives are effective oxygen reduction catalysts below about 80° C. Raney alloys, such as very high surface area nickel stabilized against recrystallization by titanium, also are good oxygen reduction catalysts for operation at temperatures between about 200°–260° C. The highest catalytic activity ever reported for oxygen reduction was obtained using a heat-treated cobalt tetraphenyl porphyrin deposited on high surface area carbon (*Fuel Cell Systems*, (Eds. Blomen, L. J. M. J., and Mugerwa, M. N.), Plenum Press, New York, 1993, Chapter 2: pp. 42–52, 63–69, Chapter 3: pp. 88–97, p. 110, Chapters 7, 8, 11).

Potassium hydroxide represents the alkaline electrolyte of choice. Potassium hydroxide possesses higher conductivity than sodium hydroxide and the conductivity of concentrated aqueous potassium hydroxide increases rapidly with temperature. Oxygen electrode performance improves with concentration (Appleby, A. J., and F. R. Foulkes, *Fuel Cell Handbook*, Krieger Publishing Co., Malabar, Fla., 1993, Chapters 8, 10, 11, 12, 13, 16) and increase in alkali concentration also permits fuel cell operation at lower pressures. At close to ambient temperatures, the optimum electrolyte concentration is about 6N (27 wt. %). At higher temperature, concentrations as high as 12N (46 wt. %) can be used. The upper temperature limit for alkaline electrolyte use is about 260° C., which was the temperature employed by alkaline (75–85 wt. % potassium hydroxide) fuel cells, using pure $H_2$ and $O_2$, used in the Apollo missions.

The only real disadvantage of alkaline electrolytes is the reaction of alkaline electrolytes with $CO_2$ to form carbonate, which degrades fuel cell performance drastically. This harmful reaction interferes with oxygen reduction kinetics in that it reduces $OH^-$ concentration, causes an increase in electrolyte viscosity reducing diffusion coefficients, reduces oxygen solubility, causes electrode degradation due to carbonate precipitation in electrode pores, and reduces electrolyte conductivity. Historically, therefore, alkaline fuel cells have used purified hydrogen fuel, and the direct use of organic fuels and impure ($CO_2$-containing) hydrogen has not been viable.

For operation at temperatures up to 200° C., phosphoric acid is the acidic electrolyte of choice. However, use of an acid electrolyte, in contrast to an alkaline electrolyte, essentially limits the choice of electrocatalyst to a noble metal catalyst. Current phosphoric acid fuel cell technology uses a 100% concentrated phosphoric acid electrolyte and noble metal catalysts for both fuel cell electrodes.

U.S. Pat. No. 4,443,522 teaches a fuel cell comprising spaced apart ion permeable membranes in a fluid receiving chamber, which membranes divide the chamber into adjacent cathode and anode compartments and, thus, establish acid-base interfaces between the compartments. The cathode is disposed in an acid electrolyte solution in the cathode compartment and the anode is disposed in a base electrolyte solution in the anode compartment. However, the ionexchange membranes dividing the chamber into adjacent cathode and anode compartments are not of a type which readily permits the conversion of alcohols into electricity, such as in a direct hydrocarbon fuel cell, without crossover of at least a portion of the alcohol fuel from the anode side to the cathode side of the fuel cell with the resultant deleterious consequences.

U.S. Pat. No. 5,318,863, U.S. Pat. No. 5,350,643, U.S. Pat. No. 4,894,301, U.S. Pat. No. 5,162,166, U.S. Pat. No. 4,988,583, and U.S. Pat. No. 4,828,941 teach various means for separating the anode and cathode of a fuel cell. In particular, the '863 patent teaches the use of a Nafion separator/membrane; the '643 patent and the '583 patent teach the use of solid polymer electrolyte membranes; the '301 patent teaches the use of a proton conducting electrolyte; the '166 patent teaches the use of an electron insulating/ion conducting electrolyte; and the '941 patent teaches the use of a $CO_2$-permeable anion exchange membrane electrolyte. U.S. Pat. No. 4,981,763 teaches a fuel cell comprising a pair of electrodes, a reaction layer positioned between the electrodes, and an electrolyte layer interposed between confronted reaction layers and holding therein an electrolyte for transmission of ions produced by the electrochemical reaction. All these patents suffer from one or more drawbacks; Nafion and other said polymer electrolytes are permeable to methanol and are inadequate for fuel cell use; other solid state electrolytes have inferior proton/ion conductivity for low temperature use and/or are $CO_2$ permeable.

U.S. Pat. No. 5,252,410, U.S. Pat. No. 5,272,017, and U.S. Pat. No. 5,132,193 all teach the use of Nafion for separation of the anodes and cathodes of the respected fuel cell assemblies. However, Nafion as stated previously is known to be permeable to organic fuels such as methanol and, thus, is not suitable for use in a fuel cell or other electrochemical device which utilizes methanol as one of the reactants.

SUMMARY OF THE INVENTION

It is an object of this invention to provide an electrolyte system for fuel cells and other electrochemical reactors which combines the best features of alkaline fuel cells and phosphoric acid fuel cells. It is an object of this invention to provide an electrolyte system suitable for use in a fuel cell or other electrochemical device which allows proton transfer through the electrolyte system but prevents crossover of larger chemical species from one electrode side to the other electrode side of the fuel cell.

These and other objects of this invention are achieved by a hybrid electrolyte system for fuel cells and other electrochemical reactors comprising an acid electrolyte, a base electrolyte, and a dense phase separating the acid electrolyte from the base electrolyte. The dense phase separating the acid electrolyte from the base electrolyte is critical to the successful operation of the hybrid electrolyte system in accordance with this invention in that it is permeable to hydrogen, all the while being impermeable to larger chemical species including organic molecules. In this manner, separation of the said electrolyte from the base electrolyte is maintained and the crossover of hydrocarbon fuels, such as methanol, from the anode side to the cathode side of the fuel cell is prevented.

More particularly, the electrolyte system of this invention is a composite comprising a dense proton permeable phase, such as palladium hydride, which separates an alkalicontaining matrix, for example concentrated potassium hydroxide in a teflon-bonded potassium hexatitanate matrix, or circulating alkali electrolyte, from an acid-containing matrix, for example concentrated phosphoric acid in a teflon-bonded silicon carbide matrix. This electrolyte system enables separate compartmentalization of the air (oxygen) electrode with an alkaline electrolyte and the fuel electrode with an acid electrolyte, respectively, while still maintaining the integrity of the fuel cell system.

BRIEF DESCRIPTION OF THE DRAWINGS

The above-mentioned and other features and objects of this invention will be better understood from the following detailed description taken in conjunction with the drawings wherein.

DESCRIPTION OF PREFERRED EMBODIMENTS

Figure 1:
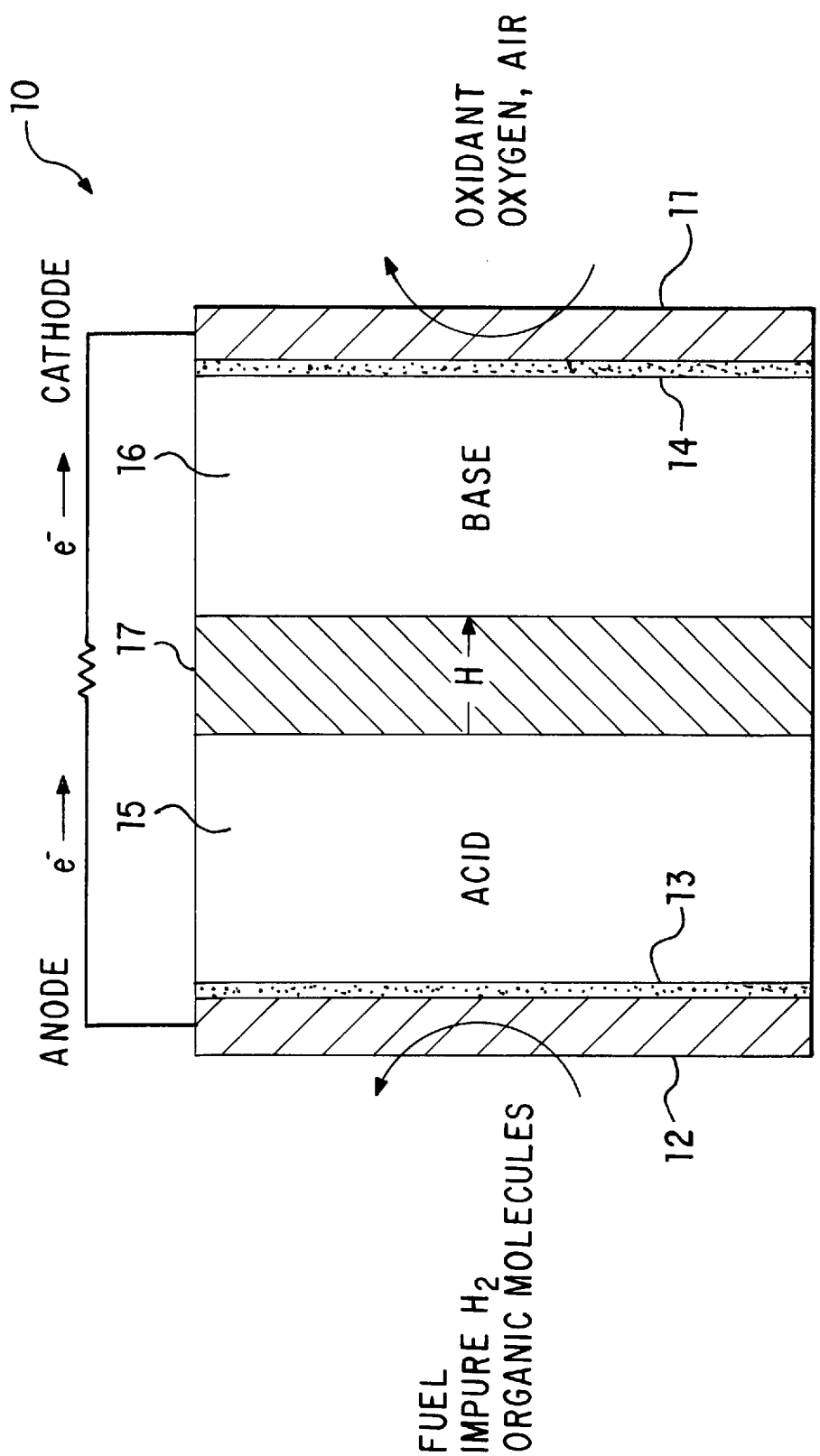
FIG. 1 is a schematic diagram of a hybrid acid/base fuel cell electrolyte system in accordance with one embodiment of this invention.

The critical feature of the electrolyte system of this invention is the simultaneous use of both an acid electrolyte and a base electrolyte which is made possible by the presence of a dense phase, such as a foil of proton permeable material which physically separates the acid and base to the electrode compartments where they are most beneficial to electrochemical performance. The main advantages of alkaline fuel cells due to the electrochemical properties of alkaline electrolytes have already been discussed hereinabove. In particular, the electrode reaction kinetics for oxygen reduction are much better in an alkaline electrolyte versus an acid electrolyte. The use of an alkaline electrolyte allows for the use of a variety of metal catalysts, both noble and non-noble metals. In contrast thereto, the use of an acid electrolyte essentially limits the choice of electrocatalyst to a carbon-supported noble metal catalyst. However, due to the reaction of the alkaline electrolytes with $CO_2$ to form carbonate which degrades fuel cell performance, alkaline fuel cells are generally restricted to the use of purified hydrogen as a fuel; the direct use of organic fuels and impure hydrogen is not considered viable.

The innovated approach of the electrolyte system of this invention is the use of tailored electrolyte environments on each side of a hydrogen-permeable barrier for the respective electrode reactions, namely alkali (for the cathode) to take advantage of superior oxygen reduction kinetics, and acid for the anode to take advantage of its $CO_2$-rejection properties. Although alkaline fuel cells possess rapid oxygen reduction kinetics, and the use of non-noble metal catalysts is feasible, the electrolyte carbonation problem currently restricts alkaline fuel cells to the use of pure $H_2$ and $O_2$. The hybrid electrolyte system of this invention enables use of an alkaline environment for the cathode because the barrier between the cathode and the anode prevents carbonation from $CO_2$ produced at the anode. The dense phase separating the cathode from the anode permits only the transport of protons and, thus, the alkaline electrolyte never "sees" the anode and the fuel oxidation products produced there. As a result, this hybrid electrolyte system permits the direct electro-oxidation of organic fuels or impure $H_2$ at the anode in an acidic environment, while the oxygen reduction reaction is accomplished in a basic electrolyte. The hybrid electrolyte system of this invention, thus, enables a fuel cell device with higher cell potential (or less cell overpotential/voltage loss) for a given current density versus an acid-based electrolyte fuel cell. Operations at temperatures around 200° C. with appropriately pressurized and concentrated acid and alkali electrolytes insure that ohmic overpotential developed by the hybrid acid/base fuel cell is maintained sufficiently low and enhanced cathode kinetics insures superior fuel cell characteristics, that is current-voltage performance, versus known phosphoric acid fuel cells.

The alkaline fuel cell is the most efficient of all fuel cells and, as such, is one of the most attractive fuel cell systems for electric vehicle applications because of its advantages of high energy efficiencies/power densities, and the use of non-noble metal catalysts. The major challenge, of course, is the completely removed $CO_2$ and prevent the effects of carbonation. For both space and terrestrial applications, the use of alkaline fuel cells, thus, is presently limited to the use of pure $H_2$. The $CO_2$ removal problem, however, is greatly diminished in the hybrid fuel cell of this invention compared to alkaline fuel cells because only $CO_2$ removal from the oxidant is required, even if organic fuels or impure hydrogen are oxidized at the anode. In short, fuel cells utilizing the hybrid acid/base electrolyte system of this invention allow the use of alkaline electrolytes for the direct electrochemical oxidation of organic fuels, either for electricity production or chemical synthesis, and for the direct electrochemical oxidation of impure hydrogen (containing $CO_2$), obviating the need for scrubbing $CO_2$ removal processes required by known devices.

FIG. 1 is a schematic diagram of a hybrid electrolyte system in a fuel cell configuration in accordance with one embodiment of this invention. As shown, hybrid fuel cell 10 comprises a dense phase proton permeable material 17 separating acidic electrolyte-containing matrix layer 15 from basic electrolyte-containing matrix layer 16. Adjacent to the face of basic electrolyte matrix layer 16 facing away from dense phase proton permeable material 17 is electrocatalyst layer 14, adjacent to which is porous gas diffusion cathode 11. Similarly, adjacent to the face of acidic electrolyte matrix layer 15 facing away from dense phase proton permeable material 17 is electrocatalyst layer 13, adjacent to which is porous gas diffusion anode 12.

By the term "dense phase proton permeable material" we mean a material which is permeable to protons but impermeable to chemical species larger that atomic hydrogen. In accordance with a preferred embodiment of this invention, said dense phase proton permeable material comprises a foil of a metal hydride. In accordance with a particularly embodiment of this invention, said dense phase proton permeable material comprises palladium hydride.

In accordance with one preferred embodiment of this invention, the acid electrolyte is disposed within a matrix material. In accordance with one particularly preferred embodiment of this invention, the acid-containing matrix material comprises concentrated phosphoric acid in a silicon carbide matrix.

Similarly, the base electrolyte in accordance with one embodiment of this invention is also disposed within a matrix material. In accordance with one particularly preferred embodiment of this invention, said base-containing matrix comprises concentrated potassium hydroxide in a potassium hexatitanate matrix. It will be apparent to those skilled in the art that acids and bases which are normally employed in conventional fuel cells may be employed in the hybrid electrolyte system of this invention.

Although the problem of $CO_2$ removal is greatly diminished in a hybrid fuel cell employing the hybrid electrolyte system of this invention when compared to conventional alkaline fuel cells in that only $CO_2$ removal from the oxidant (cathode) side of the fuel cell is required. For example, if air is used as the oxidant gas, atmospheric $CO_2$ must be removed by way of scrubbers or other processes, or the effects of electrolyte carbonation must be overcome by circulating the alkaline electrolyte. Although dense phase proton permeable material 17 prevents $CO_2$ produced at the anode from carbonating the alkali on the cathode side of dense proton permeable material 17, it does so at the cost of additional impedance due to the bulk of dense phase proton permeable material 17 and the two additional interfaces created between the acid and dense phase proton permeable material 17 and the base and dense phase proton permeable material 17, respectively.

Figure 2:
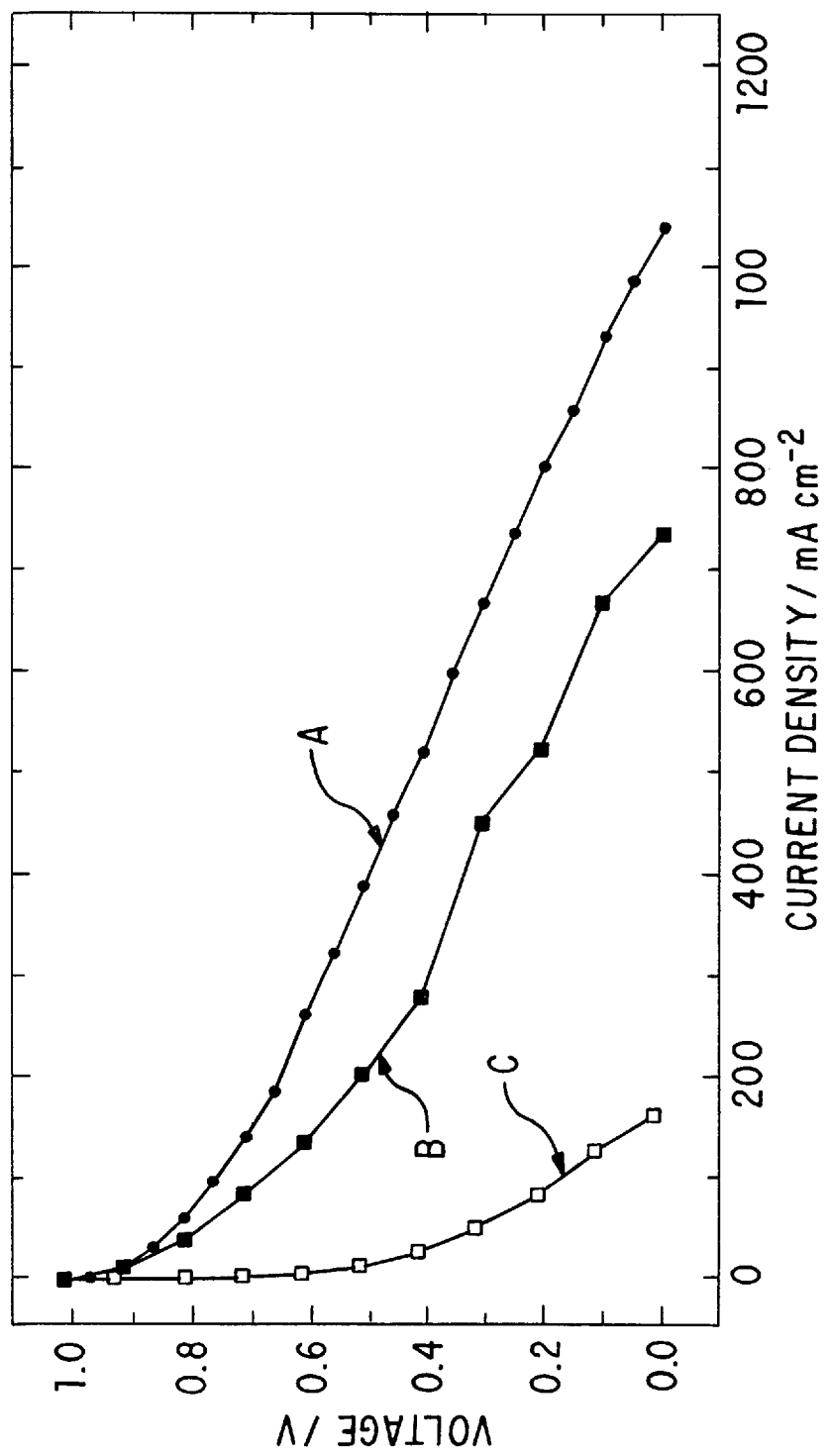
FIG. 2 is a diagram showing the effect of various preparative methods of platinum/palladium/platinum barriers on $H_2/O_2$ fuel cell performance.

FIG. 2 shows the effect of various barrier preparation methods on $H_2/O_2$ fuel cell performance. By activating the surfaces of dense phase proton permeable material 17 comprising, for example, palladium hydride with a catalytic material such as platinum, these interfacial impedances are significantly reduced so as to allow the passage of high current fluxes. Reduction of the thickness of dense phase proton permeable material 17, increase in operating temperature, and increases in the interfacial area available for proton exchange between dense phase proton permeable material 17/acid and dense phase proton permeable material 17/base, respectively, increases the current fluxes that can be passed through the electrolyte system to provide commercial viability.

EXAMPLE

We have acquired data on the use of a hybrid acid/base electrolyte system of this invention in a test fuel cell. In the test cell, a 25 micron foil of palladium modified on both sides by electrochemically deposited platinum was used as the proton permeable material. The foil was hot-pressed to one side of a Nafion 115 polymer membrane which serves as an acidic electrolyte. The other side of the proton exchange membrane was interfaced with a layer of electrocatalyst. The electrocatalyst was commercially obtained carbon supported-platinum. The test cell consisted of two compartments sealed from each other, an upper compartment open to air that could be filled with a liquid electrolyte of either acid or base, and a lower compartment with inlets and outlets for delivery of vapor phase fuel. The upper compartment was used to contain the cathode, which, for these experiments, was a high surface area platinum gauze electrode which rested upon the teflon-base of the upper compartment. A precise volume of liquid electrolyte (20 ml) was filled into the upper chamber, creating a liquid meniscus at the air/liquid/electrode three phase interface. The constant electrolyte volume also fixed the current path length from the meniscus, where most of the oxygen reduction occurs, to the palladium barrier. Pure oxygen was continuously bubbled at a flowrate of 300 ml/min into the liquid electrolyte using a capillary tube. Purified hydrogen, humidified at 80° C., was delivered to the lower compartment at a flowrate of 300 ml/min. The high surface area platinum electrocatalyst exposed to the fuel served as an anode.

Figure 3:
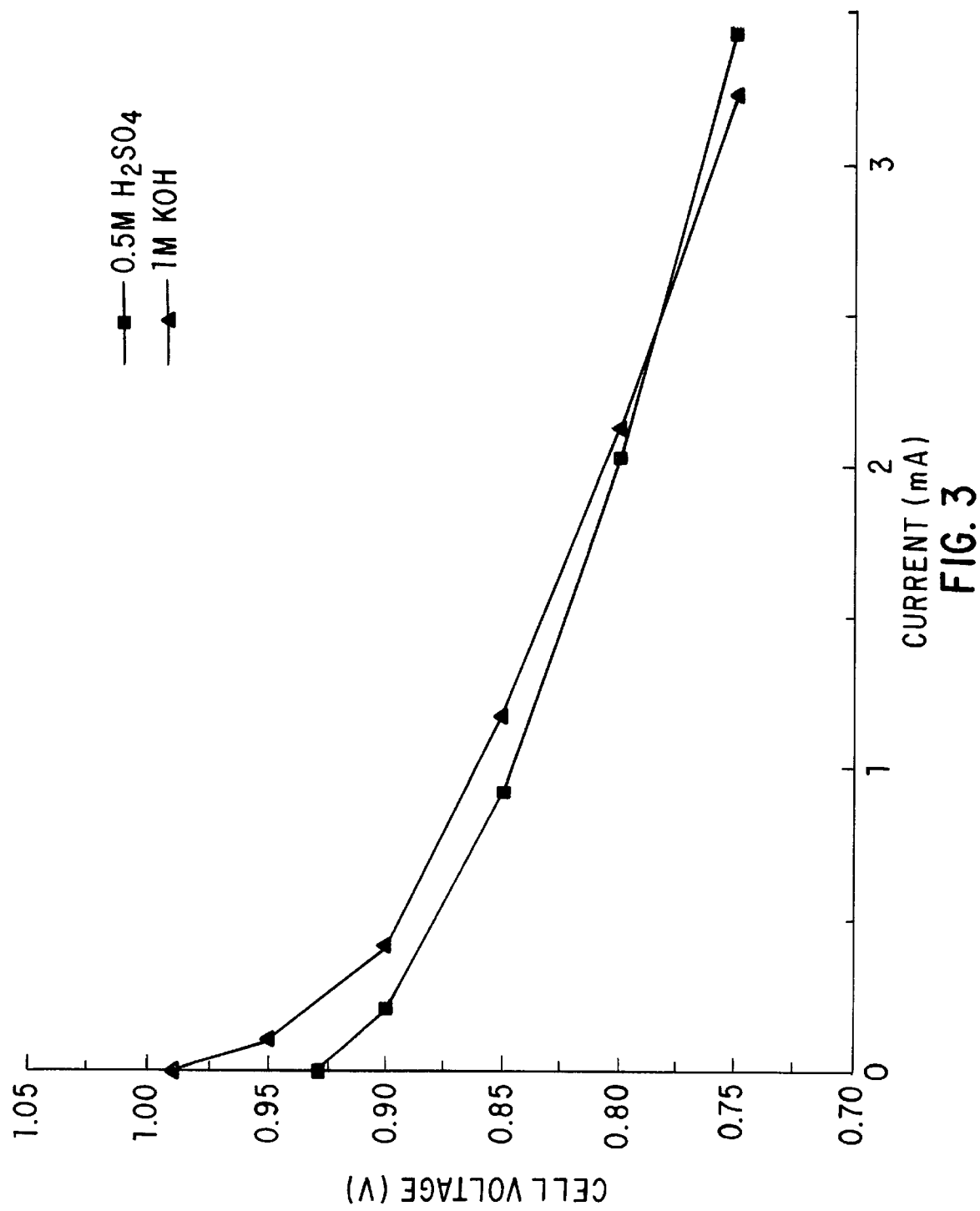
FIG. 3 is a diagram showing the effect of acidic versus basic electrolyte in the cathode compartment of a hybrid electrolyte test system.

Two experiments were performed with the cell temperature maintained at 80° C., one with 0.5M sulfuric acid in the upper compartment and one with 1M potassium hydroxide. Current-voltage (I-V) curves were measured potentiostatically for both fuel cells. Typical results are shown in FIG. 3. The primary observation of the experiment was that the open circuit voltage (OCV) for the hybrid cell containing alkali in the upper compartment was invariably higher than for the cell containing acid, typically by 60 mV, indicating superior kinetics for the oxygen reduction reaction in base. At low fuel cell currents, the current-voltage performance for the base-containing cell was superior. Because the two systems investigated directly compare the relative fuel cell performance of an acid/palladium/acid system versus a base/palladium/acid system, it can be concluded that less activation polarization (voltage loss) is developed by the hybrid acid/base fuel cell system compared to conventional fuel cell systems.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A hybrid fuel cell comprising:
    a proton permeable dense phase having an anode facing side and a cathode facing side;
    an anode electrode disposed on said anode facing side of said proton permeable dense phase;
    a cathode electrode disposed on said cathode facing side of said proton permeable dense phase;
    an acid electrolyte disposed between said anode electrode and said proton permeable dense phase; and
    a base electrolyte disposed between said cathode electrode and said proton permeable dense phase.

2. A fuel cell in accordance with claim 1, wherein said dense phase comprises a metal hydride.

3. A fuel cell in accordance with claim 2, wherein said dense phase comprises palladium hydride.

4. A fuel cell in accordance with claim 1, wherein said acid electrolyte comprises an acid-containing matrix material.

5. A fuel cell in accordance with claim 4, wherein said acid-containing matrix comprises concentrated phosphoric acid in a silicon carbide matrix.

6. A fuel cell in accordance with claim 1, wherein said base electrolyte comprises an alkali-containing matrix.

7. A fuel cell in accordance with claim 6, wherein said alkali-containing matrix comprises concentrated potassium hydroxide in a potassium hexatitanate matrix.

* * * * *